United States Patent [19]

Percec et al.

[11] Patent Number: 4,871,816
[45] Date of Patent: Oct. 3, 1989

[54] TRIBLOCK POLYARYLENE POLYETHER WITH POLYSILOXANE SEGMENT AND IMPACT-IMPROVED BLENDS THEREOF

[75] Inventors: Virgil Percec, Pepper Pike; Paul P. Nicholas, Broadview Heights, both of Ohio; Dana Garcia, Plainsboro, N.J.

[73] Assignee: The B.F. Goodrich Company, Akron, Ohio

[21] Appl. No.: 111,317

[22] Filed: Oct. 22, 1987

Related U.S. Application Data

[63] Continuation-in-part of Ser. No. 837,717, Mar. 10, 1986, abandoned.

[51] Int. Cl.$^4$ .............................................. C08G 65/48
[52] U.S. Cl. ................................... 525/393; 525/391; 525/474; 525/479; 528/15; 528/25; 528/31
[58] Field of Search ............... 525/391, 393, 474, 479; 528/15, 31, 25

[56] References Cited

U.S. PATENT DOCUMENTS

| | | | |
|---|---|---|---|
| 3,668,273 | 6/1972 | Krantz | 260/46.5 |
| 3,960,985 | 6/1976 | Cooper | 260/874 |
| 4,634,742 | 1/1987 | Percec | 525/534 |
| 4,663,402 | 5/1987 | Percec et al. | 525/534 |
| 4,701,514 | 10/1987 | Percec | 525/534 |

*Primary Examiner*—Melvyn I. Marquis
*Attorney, Agent, or Firm*—James R. Lindsay; Alfred D. Lobo

[57] ABSTRACT

Polyarylene polyethers ("PAPE") with vinyl chain ends may be crosslinked to form networks with excellent physical and chemical properties except they tend to be brittle. In particular, a polysulfone ("PSU" made from bisphenol A and dichlorodiphenyl sulfone) with vinylbenzyl chain ends ("di-VB-PSU") is too brittle for many applications where impact resistance is essential. This brittleness is combatted by inserting a thermally stable rubbery poly(dimethylsiloxane) ("PDMS") segment having a number average molecular weight in the range from about 600 to about 5000 connected to di-VB-PSU segments by hydrosilylation in the presence of a Pt catalyst, to form a thermoplastic linear predominantly triblock oligomer with vinylbenzyl chain ends which are thermally crosslinkable. When crosslinked, the network formed has improved impact resistance and toughness, with only a little loss in the upper glass transition temperature if the relative lengths of the PDMS and PAPE are such as to provide the desired degree of phase microincompatibility sufficient to improve toughness. The triblock may be blended with a polymer with which the triblock may be crosslinked upon curing. If the VB-PSU-PDMS-PSU-VB triblock is blended with di-VB-PSU the polyblend may be crosslinked to provide improved toughness.

18 Claims, No Drawings

4,871,816

TRIBLOCK POLYARYLENE POLYETHER WITH POLYSILOXANE SEGMENT AND IMPACT-IMPROVED BLENDS THEREOF

CROSS-REFERENCE TO RELATED APPLICATION

This application is a continuation-in-part of Ser. No. 837,717 filed Mar. 10, 1986, now abandoned.

BACKGROUND OF THE INVENTION

This invention is related to a polyarylene polyether (PAPE) oligomer which is thermally crosslinkable through its vinyl end groups. Such oligomers are disclosed in U.S. Pat. No. 4,562,243, the disclosure of which is incorporated by reference thereto as if fully set forth herein. Many of these oligomers form crosslinked networks which are highly resistant to thermal degradation, some at temperatures in excess of 200° C. The styryl terminated oligomers are of particular interest because they cure rapidly.

The crosslinked oligomers are especially suitable as matrix resins in high performance composites but tend to lack requisite toughness and to be somewhat brittle in applications where high impact resistance is essential, though the styryl terminated PAPE matrix is not as brittle as the highly cross-linked polyvinylbenzyl ethers disclosed by Steiner in U.S. Pat. No. 4,116,936. The problem was to find a way to modify a PAPE oligomer so that it could serve as a cocureable toughening agent when blended with the vinyl-terminated PAPE oligomer.

This invention is therefore more particularly related to the improvement of the toughness and impact of cross-linked matrices of PAPEs formed from vinyl terminated polethers of dihydroxybenzene, dihydroxynaphthalene and diphenols, each referred to herein as a dihydric phenol (DHP), including the corresponding sulfur (thio) compounds, each referred to as a dihydric thiophenol (DHTP). The parent polyethers have a number average molecular weight Mn less than about 10,000, hence termed oligomers. Oligomeric polyethers of DHPs and DHTPs contain at least three aromatic rings, which may have inert substituents, each ring linked to another through an O, Si, C or S atom. By "inert substituents" I refer to substituents which do not react so as to interfere with a hydrosilylation (or "hydrosilation") reaction of the PAPE oligomer which reaction yields siloxane block copolymers. Such DHP and DHTP oligomers are terminated at each end with a phenol or thiophenol group respectively, which group may also have inert substituents.

PAPE is used to designate both a polyarylene polyether and a polyarylene polythioether.

In linear block copolymers, it is well known that segment structure and length play an important role in determining morphology and that certain block structures can produce impact resistance. Though it is possible for siloxane blocks to enhance the toughness of a polymer, the detailed structural requirements of all the components necessary to achieve desired toughness, with its associated morphology, must be understood and experimentally verified. Moreover, it is equally well known that the behavior of block copolymers cannot be predicted from the behavior of random copolymers; and even among block copolymers, we know of no way to predict the behavior of an ABA triblock from that of an ABAB alternating block. Neither do we know of a way to predict how cross-linking influences toughening by a particular block copolymer. It is only after these considerations that we can try to experimentally determine what specific parameters of structure and segment length might provide the desired improvement.

It was found that short PDMS blocks (shorter than Mn=5000) of each alternating block chain are miscible with [4,4'-isopropylidene diphenol]-[4,4'-diphenylsulfone], or, bisphenol A-diphenylsulfone ("BPA-DPS" for brevity) blocks while long PDMS blocks are immiscible and aggregate into separate microdomains. This miscibility pertains to segments within each chain (intrachain), and between chains (interchain). In particular, with PDMS blocks having Mn above 5000, there was extreme microincompatibility of the BPA-DPS and PDMS segments. This extreme incompatibility at relatively short block lengths of Mn=5000 and above, was attributed to the widely different solubility parameters of the BPA-DPS (10.6) and PDMS (7.3) segments.

The effect of block lengths in a particular alternating block copolymer has been studied in an article titled "Morphology and Impact Resistance in Linear and Crosslinked Block Copolymers", by A. Noshay, et al;., Jour. Poly. Sci.: Polymer Symposium 60 87–95 (1977). One alternating block copolymer studied comprised from 3 to about 15 alternating blocks of BPA-DPS (diphenyl sulfone) copolymer with blocks of poly(dimethylsiloxane) (PDMS). The alternating block copolymer was derived from OH-terminated BPA-DPS by reaction with dimethylamino-terminated PDMS.

Since extreme incompatibility was desirable for toughening, and this was not obtained with block lengths below Mn=5000 (which they found to be miscible), it was obvious that block lengths above Mn=5000 with an alternating block structure, were dictated. It was thus quite fortuitous that we decided to explore the effect of short block lengths, shorter than Mn=5000. Such a short block length, particularly for the PDMS segment, turned out to be the key to obtaining better impact resistance and toughness through microphase separation of the rubbery domains upon curing. In addition, we thought there was a chance we could eliminate the effects of intrachain miscibility of PDMS segments in an alternating block copolymer, if we made a triblock, though the problem of tailoring the lengths of each segment still remained.

From an examination of a crosslinked block copolymer model system of epoxy-anhydride/caprolactone blocks alternating with linear polycaprolactone blocks, Noshay et al concluded that qualitatively, the same features which govern the behavior of uncrosslinked BPA-DPS-PDMS block copolymers also govern that of crosslinked block copolymers. But no suggestion was made as to how to predict such features, and in particular, how to crosslink a BPA-DPSPDMS block copolymer. Nor was there any consideration of the kinetics of the crosslinking reaction which could exert severe constraints against the formation of desired microphase separated morphology when compared with uncrosslinked copolymer.

We know of no teaching as to the applicability of a hydrosilation reaction to provide the proper triblock segment structure for any reason, and particularly to eliminate the intrachain miscibility effects which require the use of relatively long (Mn of 5000 or more) chain segments. Nor do we know of any teaching to suggest a desirable chain length for a crosslinkable PAPE-PDMS-PAPE triblock with vinyl end groups, which when blended with PAPE containing vinyl end groups will form a thermally cocurable matrix with improved impact resistance and toughness.

Various studies have been reported in articles titled "Synthesis of Poly(Sulphone-b-Siloxane)s" by D. Gagnebien et al *Eur. Polym. J.* Vol.21, No.3, pp 280–308 (1985) to characterize the structure of the block copolymers formed using a hydrosilation reaction to introduce a polysiloxane segment, but there is no teaching as to what the effect of the introduction of a single polysiloxane segment in a chain might be, nor the effect of crosslinking the OH-terminated polysulfone with an oligomer having epoxy chain ends, assuming this could have been accomplished.

The triblock oligomers of this invention were the end result of several syntheses each of which tried to find an effective modification of a PAPE with vinyl end groups to improve its toughness and impact resistance without substantially decreasing the upper glass transition temperature (Tg) of the cured resin, and its resistance to thermal degradation.

SUMMARY OF THE INVENTION

It has been discovered that a polyarylene polyether (PAPE) oligomer having vinyl end groups can be hydrosilated to form a triblock oligomer with a single polydimethylsiloxane (PDMS) segment and thermally crosslinkable chain ends.

It has further been discovered that when the triblock is blended with a PAPE having vinyl end groups, then crosslinked, the matrix formed has little loss in upper Tg, exceptional resistance to thermal degradation, excellent impact resistance, and toughness due to the extreme microincompatibility generated by the elimination of intrachain miscibility of PDMS segments, there being but one PDMS segment in a triblock.

It is therefore a general object of this invention to provide a triblock oligomer having a single PDMS segment flanked by PAPE segments having crosslinkable vinyl end groups, and the mol wt of each segment is tailored to provide desired microincompatibility, sufficient to diminish the brittleness of the crosslinked triblock without sacrificing the resistance to thermal degradation desired in a high temperature adhesive or matrix resin.

It is also a general object of this invention to provide a blend of a minor proportion by weight of the triblock, the remainder being the PAPE oligomer with vinyl end groups, which blend when crosslinked, provides desirable toughness and impact resistance without substantially lowering the upper Tg.

It is a specific object of this invention to provide a thermally crosslinkable triblock consisting essentially of a PDMS segment having a Mn in the range greater than 600 but less than 5000, connected by hydrosilation to a bisphenol A sulfone, identified by the structure (1) herebelow, having a Mn in the range from about 700 to about 10,000, each of which bisphenol A sulfone segments has a styryl (or vinylbenzyl "VB") chain end.

DETAILED DESCRIPTION OF PREFERRED EMBODIMENTS

The process of our invention provides for the formation of vinyl terminated triblocks through a hydrosilation reaction where one of the reactants is a vinyl terminated polyarylene polyether or polyarylene polythioether (PAPE) oligomer represented by the following structure:

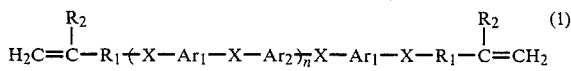

wherein, X represents O or S,

Ar$_1$ and Ar$_2$ represent the same or different monoarylene or diarylene segments identified hereinbelow, R$_1$ represents an organic connecting group selected from benzylidene

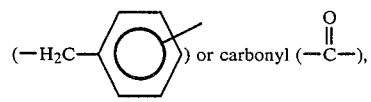

R$_2$ represents H or CH$_3$, and, n represents an integer corresponding to Mn from about 700 to about 10,000 for the vinyl-terminated PAPE.

The structure (1) is made by etherification or esterification of an OH or SH-terminated PAPE represented by the following structure (2), with a reactant bearing the appropriate vinyl group:

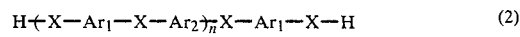

The triblock is formed by the hydrosilation of (1) with the α,ω-dihydrosiloxane (3) represented by:

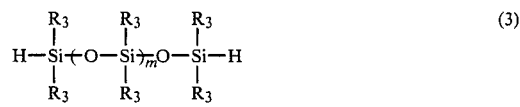

wherein m represents an integer in the range from about 8 to about 80; and,

R$_3$ represents lower (C$_1$ to C$_4$) alkyl. The structure of the triblock formed is represented by the following formulae (4) and (4') which differ only in the direction of hydrosilation of the double bond. Undoubtedly, triblocks containing both forms of connectivity to the siloxane block are also present.

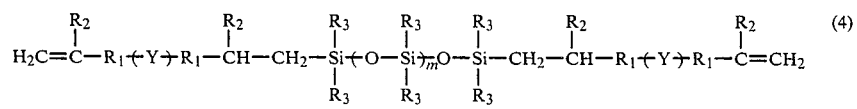

and

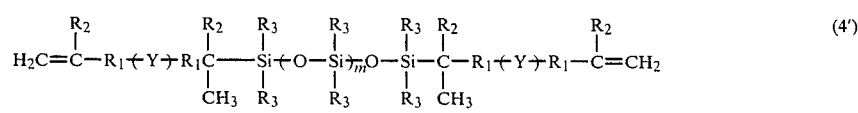

In 4 and 4' Y is defined as the structure (2) with the terminal hydrogen atoms eliminated.

The poly(dimethylsiloxane) block has Mn in the range from about 600 to about 5000; and, the triblocks are derived from (1), having Mn in the range from about 700 to about 10,000, preferably from about 900 to about 5000; so that the Mn of the triblock ranges from about 2000 to about 25,000, preferably from 3000 to 10,000.

Among oligomers (1) which may be used to form the triblock, are (A) aromatic polyether sulfones and polythioether sulfones exemplified by BPA-DPS and BTPA-DPS wherein,

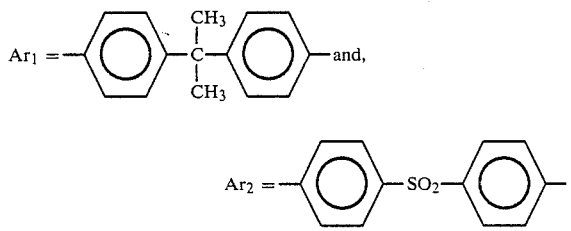

(B) PPO oligomers prepared as described in copending U.S. patent appln. Ser. No. 814,748 filed Dec. 30, 1985, now U.S. Pat. No. 4,665,137, the disclosure of which is incorporated by reference thereto as if fully set forth herein. In Y of this triblock

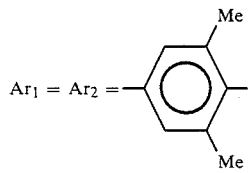

where Me = methyl and, in each chain there is a single tetramethylbiphenylene linking group,

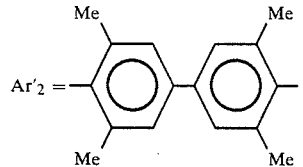

to provide for correct end groups.

Optionally the foregoing PPO oligomer may be prepared as disclosed in "Reactions of Poly(phenylene Oxides)s with Quinons. I. The Quinone-Coupling Reaction Between Low Molecular Weight Poly(2,6-Dimethyl-1,4-phenylene oxide) and 3,3',5,5'-tetramethyl-4,4'-Diphenoquinone" by Dwain M. White, Jour. Polym. Sci., Polym. Chem. Ed., Vol 19, 1367-83 (1981); and, (C) aromatic polyethers and thioethers wherein $Ar_1$ and $Ar_2$ may be other aromatic radicals as defined herein. Thus, a wide spectrum of oligomers with terminal OH or SH groups may be esterified or etherified to contain terminal reactive vinyl groups. These oligomers, with their monoarylene and/or diarylene segments, may then be used in the triblock which rapidly polymerizes thermally to yield solvent resistant, tough, impact resistant, materials.

Alkali metal salts of the PAPE oligomers (2) are essentially insoluble at room temperature, or only soluble in the aforementioned solvents at elevated temperatures in the range from about 70°-150° C., yet may be esterified or etherified to (1) essentially quantitatively. PAPE (2) may be derived, for example, from halide displacement reactions of diphenols or dithiophenols on a dihalogen-substituted precursor selected from the group consisting of a dihaloalkane having from 1 to about 18 C atoms, more preferably an α,ω-dihalo-lower alkane (e.g. dichloromethane) including the corresponding α,ω-di(methanesulfonates); phosgene; alkyl diacid halides such as adipoyl chloride; aryl diacid halides such as terephthaloyl chloride; dihalophenyl phosphonate (or phenyl dichlorophosphine oxide, DCPP); aromatic dihalides such as dichlorodiphenylsulfone; bis(haloalkoxy) alkanes such as bis(chloromethoxy)butane; and, dihalocycloalkanes having from 3 to about 7 ring C atoms such as bis(chloromethyl)cyclohexane, or the corresponding di(methanesulfonates). There may be different DHPs or DHTPs present in these reactions as well as different dihalides, resulting in more than two kinds of Ar in (2).

Preferred oligomers (2) are formed from one or more dihydric phenols or dihydric thiophenols having a structure selected from (5) and (6) herebelow

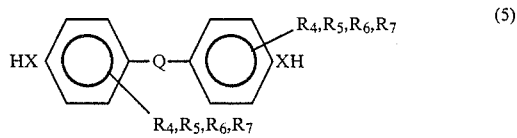

and

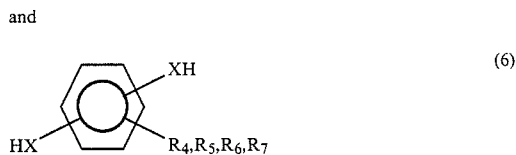

wherein X represents O or S;

Q represents a bond between aromatic carbon atoms and a divalent connecting radical selected from the group consisting of C=O, —O—, —S—, —SO$_2$—, —Si— and divalent organic radicals such as alkylidene, cycloaliphatic, or the alkyl, aryl, or like substituted alkylidene, and cycloaliphatic radicals as well as alkarylene, cycloalkyl and aromatic radicals; and, $R_4$, $R_5$, $R_6$, and $R_7$ referred to herein as inert substituents on each ring C atom, may, if present, each be the same or different and represent NO$_2$; C$_1$-C$_{18}$ alkyl, without regard for spatial configuration such as normal, iso or tertiary; C$_1$-C$_{18}$ alkoxy; and hydrogen.

As written in the formulae, it will be evident that HX and Q are preferably para to each other in diphenols, as are XH in mononuclear phenols.

When $Ar_1$ is derived from BPA and $Ar_2$ from 4,4'-dichlorodiphenyl sulfone (DCDPS), the SO$_2$ group is the activator, and the Cl atoms are displaced by the diphenoxide derived from BPA. The identity of the activator group is not critical as long as it is inert in this displacement reaction. Thus it will now be evident that when $Ar_1$ originates from a diphenol linked with Q representing —O—, —S—, or —Si—, then, if the desired $Ar_2$ is to be derived from a dihalogen-substituted aromatic compound, it should contain a strong activator group such as —CO—, or —SO$_2$—. The preferred strong activating groups are —CO—, or —SO$_2$—. The most preferred strong activating group is the sulfone as in DCDPS and 4,4'-difluorodiphenyl sulfone, although such other strong electron withdrawing groups as hereinbefore mentioned may also be used.

The alkyl substituents may be cyclic or acyclic, including alkyl-substituted cyclic, as long as the total carbon content conforms to the defined amount, and the same is true for alkoxy groups, provided all substituents are inert under hydrosilation reaction conditions. The inert substituents may be the same or different, though it will be apparent that some substituents will be easier than others for steric and other reasons.

Preferred Y segments in the triblocks are formed with a dihydric polynuclear phenol selected from the group consisting of 2,2-bis(4-hydroxyphenyl)propane; bis(4-hydroxyphenyl) silane; di(hydroxyphenyl) sulfone; di(-hydroxyphenyl) ketone; di(hydroxyphenyl) sulfide and di(hydroxyphenyl) ether; and, from the mononuclear phenol 1,4-dihydroxybenzene. Most preferred triblock with a mononuclear phenol is with polyphenylene oxide (PPO) segments linked with a single biphenylene or other appropriate connecting group to provide OH end groups for the PAPE segment thus formed.

Preferred combinations of particular dihydric phenols together with dihalides used to produce Y include the following:
 (i) BPA and DCDPS;
 (ii) BPA and 4, 4'-dichlorobenzophenone;
 (iii) 4,4'-di(hydroxyphenyl) sulfone and 4,4'-dichlorobenzophenone;
 (iv) 4,4'-di(hydroxyphenyl) ether and DCDPS;
 (v) 1,4-dihydroxybenzene and DCDPS;
 (vi) 4,4'-di(hydroxyphenyl) sulfide and DCDPS;
 (vii) BPA, with 1,4-dihydroxybenzene, and, DCDPS, provided there is enough DCDPS used to react with all the DHPs present;
 (viii) 1,4-dihydroxybenzene and diphenyl sulfone.

For a given siloxane (3), the rate of hydrosilation is essentially unchanged when X represents either O or S for an otherwise identical vinyl-terminated oligomer (1). That is, the particular structure whether it is a polyether or polythioether is not narrowly critical. Likewise, for a given (3), toughness will not vary greatly with X = either O or S, as long as the cured oligomer provides the desired phase separated morphology.

It is also contemplated in this invention to use a mixture of two or more different DHPs or DHTPs to accomplish the same ends as above. Thus, when referred to above, the $Ar_1$ and $Ar_2$ in these polymer structures can actually be the same or different, and when different may be as many as four.

When $Ar_1$ and $Ar_2$ represent the same monoarylene segment, said PAPE includes a single tetra($C_1$-C2)alkylsubstituted biphenylene linking group to provide for correct end groups on said PAPE which is then defined by the structure

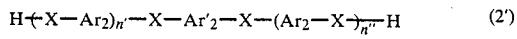

wherein

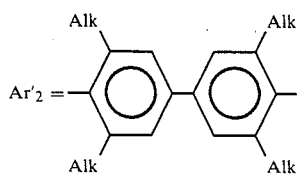

Alk = $C_1$-$C_2$ alkyl with $n'+n''=n$. Most preferred linking group for a PAPE with PPO segments is derived from tetramethyldihydroxybiphenyl.

It is preferred that when $Ar_1$ and $Ar_2$ are different, that $Ar_2$ be derived from a dihalosubstitued arene which has the two displaceable halogen atoms bonded in the parapositions of the two benzene rings which are connected by a group Q, but where Q is an electron withdrawing group (5') having the structure

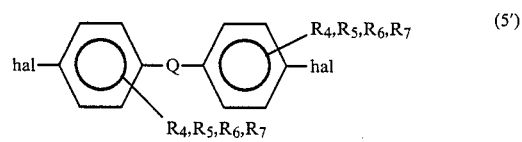

where 'hal' represents halogen. The dihalobenzenoid compound may also be mononuclear where the halogens are attached to the same benzene ring as long as it contains an activating electron withdrawing group.

Any of the halogens may be the reactive halogen substituents on the benzenoid compounds. Fluorine and chlorine substituted benzenoid reactants are preferred; the fluorine compounds for fast reactivity, and the chlorine compounds for their low cost.

Most preferred dihydric polynuclear phenol source of $Ar_1$ is bisphenol A, and derivatives thereof which may be substituted with inert substituents; and the most preferred source of $Ar_2$ is DCPS. However, 4,4'-dihydroxydiphenyl sulfone may be a source of $Ar_1$ if $Ar_2$ is 4,4'-dichlorobenzophenone. Also, 4,4'-dihydroxybenzophenone may be a source of $Ar_1$ if $Ar_2$ originates from DCDPS.

Thus it will be evident that from among the following dihydric polynuclear phenols, certain aromatic nuclei (Ar) could originate from both the phenol or an arene substituted with displaceable halogens. Preferred dihydric phenols include the following:

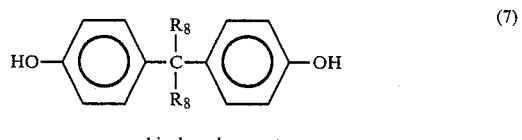

a bisphenol

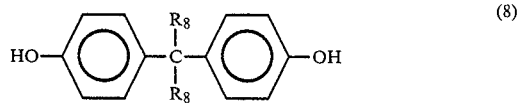

a bis(4-hydroxyphenyl) silane in which $R_8$ represents hydrogen, $C_1$-$C_5$ lower alkyl, phenyl and $R_8$ may each be the same of different;

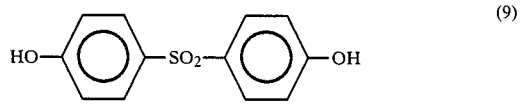

a di(hydroxyphenyl) sulfone

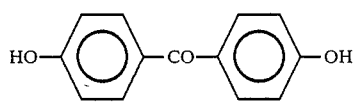

a di(hydroxyphenyl) ketone (10)

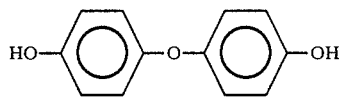

a di(hydroxyphenyl) ether (11)

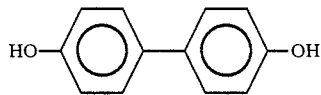

a dihydroxybiphenyl (12)

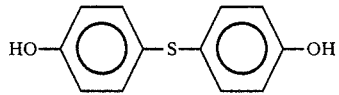

4,4'-di(hydroxyphenyl)sulfide (13)

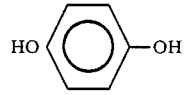

1,4-dihydroxybenzene (14)

and the corresponding thiophenols.

Most preferred are oligomers in which $Ar_2$ originates from a 4,4'-dihalodiphenyl sulfone or ketone, and $Ar_1$ from BPA.

Examples of the particular foregoing polynuclear phenols, and others referred to by the structure (5) are given in U.S. Pat. No. 4,108,837 the disclosure of which is incorporated by reference thereto as if fully set forth herein. The details of the process for preparing oligomer (1) are given in the '243 patent.

Preferred combinations of $Ar_1$ and $Ar_2$ are set forth in the following Table of Combinations. The connecting group Q, or bond, if no connecting group is present, is listed for each Ar represented by the structure in each combination of $Ar_1$ and $Ar_2$.

| Table of Combinations | |
|---|---|
| Q | |
| $Ar_1$ | $Ar_2$ |
| 1. $CH_3$—C—$CH_3$ | $SO_2$ |
| 2. $CH_3$—C—$CH_3$ | CO |
| 3. $SO_2$ | CO |
| 4. O | $SO_2$ |
| 5. S | $SO_2$ |
| 6. none | $SO_2$ |
| 7. none | CO |

The hydrosilation reaction, which comprises the addition of the hydrosilane ($\equiv$Si—H) groups in (3) to the two vinyl end groups of the PAPE oligomer (1) is catalyzed by platinum. Either $H_2PtCl_6 \cdot 6H_2O$ as a 0.058M solution in isopropanol is used, or a proprietary Pt catalyst #SLM86003 from Wacker Chemie, West Germany, or a 3% by wt solution of a soluble form of Pt in polydimethylsiloxane obtained from Petrarch Chemicals.

Specific illustrative examples, prepared in a range of mol wts by the method disclosed in the '243 patent, are provided hereinbelow for the formation of a triblock (1) (coded "PSU" in Table 1) comprising a BPA-DPS polysulfone with vinylbenzyl (VB) end groups, where $R1$=benzylidene $R_2$=H, X =O (oxygen), and, $Ar_1$ and $Ar_2$ are identified by entry #1 in the Table of Combinations. Briefly, this material is prepared by the reaction of the corresponding OH-terminated oligomer (2) with chloromethylstyrene (ClMS) in the presence of aqueous base and tetrabutylammonium hydrogen sulfate as phase transfer catalyst. Only the para-isomer of ClMS is used to avoid any differences in isomeric reactivity in either the hydrosilation or the curing reactions. An alternative method for preparation is by a non-catalytic process described in copending U.S. patent application Ser. No. 814,749 the disclosure of which is incorporated by reference thereto as if fully set forth herein.

The mol wts and thermal characterization of the resulting $\alpha,\omega$-di-VB-PSU made are given in Table 1. Each of six PSUs is listed by sample number according to mol wt in ascending order. This identification by sample number is adhered to in Table 3 herebelow. It is evident that the difference between final Tg and initial Tg ($Tg^f$-$Tg^i$) in Table 1 decreases as the mol wt of the di-VB-PSU increases.

The resulting triblocks can be prepared by using a molar excess, that is more than 2 moles of the di-VB-PSU for each mole of PDMS, to ensure that the triblock is predominantly formed, though some of the higher blocks are likely present. The precise excess is not critical, particularly if the triblock formed is to be blended into the divinyl-terminated oligomer from which it was derived, but a ratio in the range from about 2.5:1 to about 6:1 is preferred.

The PDMS (3) was obtained either from Petrarch Chemicals or from Wacker Chemie, and used as received. They were characterized by VPO, GPC, NMR and DSC. The characterization of these $\alpha,\omega$-di(silane)-polydimethylsiloxanes is set forth in Table 2. Each of seven samples is listed by sample number in ascending order of mol wt, and this identification is adhered to in Table 3 herebelow. All samples with the exception of sample #1 show Tg, Tc (crystallization temperature) and two (2) Tm's (melting transition) when heated at 10°/min after quenching below Tg. Comparable phase separation characteristics are expected of other lower alkyl siloxane polymers.

Preparation of the Triblock with Stoichiometric Amount of Segments:

One gram (1 g) of the VB-PSU oligomer (1) was dissolved in 2 ml of dried chlorobenzene together with PDMS in a 2/1 molar ratio (based on VPO Mn). Hydroquinone was used as inhibitor. The mixture was heated to 100° C. under $N_2$ with vigorous stirring, the elevated temperature used being insufficient to crosslink a substantial amount of di-VB-PSU. Often the mixture was not homogeneous (oligomer incompatibility) so just enough chlorobenzene was added to the solution at 100° C. to obtain an optically clear solution. This amount varied with the mol wt of the oligomers and proved important in obtaining complete conversion. After further purging with $N_2$, 1 drop (about 0.02 ml) of the Wacker catalyst solution was added. The solution was then sparged vigorously with $N_2$ at such a rate as to remove solvent as quickly as possible while maintaining homogeneity. After concentrating the solution to 1 g polymer in 1.5-2.0 ml, the reaction was allowed to proceed for several hours at 100° C. The reaction mixture was then cooled, diluted with $CHCl_3$, and precipitated into methanol. The polymer was further purified by dissolution in $CHCl_3$, precipitation with methanol, and then drying under vacuum at room temperature. Recovered yields were greater than 95%. The preparative method starting with the polysulfone having bisphenol A chain ends, is schematically outlined herebelow. The structure of the starting oligomer (2) is as follows:

showed that 95% of the ≡Si—H groups had reacted and the expected structure was formed.

The triblock predominantly formed is blended with diVB-PSU in amounts from 1 to 50% by wt, and thermally crosslinked. It is found that the modulus (ksi) decreases and the elongation at break nearly doubles as the triblock content approaches 50%. Visual evidence (microscopy) of the improved toughness is the microincompatibility obtained. This microincompatibility is present in blends in which the PDMS segment is in the range from Mn 600 to about 5000, but is most pronounced in the range from about Mn 1200 to about 2500. The Tg of the cured polyblend approaches that of the cured di-VB-PSU homopolymer, being about 180° C. over a wide range of triblock wt content, but with a

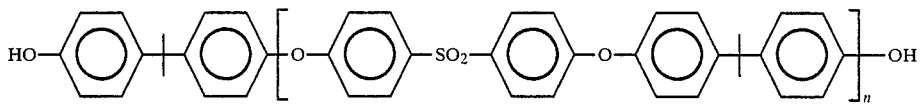

wherein n is an integer in the range from 1 to about 20, and, each of the vertical lines between connected phenyl groups represents a methyl group.

All 12 samples listed in Table 3 were prepared with the stoichiometric amount of 2 mols PSU to 1 mol of PDMS, using the identified samples of each having the mol wt indicated parenthetically in the second column (from left). The data is grouped in four groups A–D.

Group A (samples 1, 5–8) includes triblocks made with a low mol wt PDMS (#1, mol wt 540). The very short PDMS segment lowers the Tg of the PSU and the resulting network, because of poor phase separation. In all cured samples, Tg approaches its final value ($Tg^f$) after only one run to 260° C. (at 10° C./min).

Group B (samples 1–4) includes triblock made with a low mol wt PSU (#1 mol wt 1200). Due to the low mol wt of the PSU, phase separation for PSU is poor and again the $Tg^i$ and $Tg^f$ are significantly lowered. For the two highest mol wts of PDMS in this group (#3,4) a separate PDMS phase is observed.

Group C (#7–10) includes triblocks made with a higher mol wt PSU (#4, mol wt 3800). With increasing mol wt of the PDMS segment, phase separation is improved and the Tg of the PSU segment (before and after cure) approaches that of the parent PSU oligomer (see Table 1).

Group D (#10–12) includes triblocks made with the relatively high mol wt PDMS (#3, mol wt 3400) and PSU segments with 2100 mol wt, which triblocks show improved phase separation as well as higher Tgs before and after cure.

Preparation of the Triblock with Molar Excess of Segments 120 g of the di-VB-PSU oligomer (Mn 1600) was combined with PDMS (mol wt 1880) in a 4/1 molar ratio and dissolved in 800 ml of toluene at room temperature. The system was purged with nitrogen or argon and 0.60 g of the Petrarch 3% Pt catalyst in 10 ml of toluene was added. The mixture was stirred at room temperature under nitrogen or argon for about 65 hr. The solution was filtered, concentrated to about 400–500 ml on a rotary evaporator, and the polymer precipitated by slowly adding the solution to vigorously stirred methanol. Analysis by 400 MHz H-NMR broadened Tg, further confirming the toughness of the polyblend.

The thermal characteristics of cured blends comprising PSU triblocks in di-VB-PSU where the mol wt of the PSU segments is fixed and the mol wt of the PDMS segment is varied, are set forth in Table 4 herebelow. It is noted that the Tg of the PSU segments of the triblocks does not vary substantially from the Tg of cured di-VB-PSU by itself (about 190° C.). No Tg(PDMS) is discernible for the triblock with low mol wt (656) PDMS though some microphase incompatibility is visually detected in photomicrographs. Such phase incompatibility is clearly visible in the medium range mol wt (1880) PDMS in which the Tg of the PDMS segment is −130° C. This results in toughness and good improvement in impact strength. At the higher level, mol wt (5433) PDMS, the Tg of the PDMS segment is −125° C but the phase incompatibility is macroscopic, so that there is no appreciable improvement in impact strength.

The foregoing thermal data provides evidence that for the mol wt (about 2000) of di-VB-PSU used in forming the triblock, desirable microphase incompatibility is obtained with a PDMS segment of Mn about 2000, and is maintained for PDMS segments in the most preferred range of from about Mn 1200 to about 3400. The most preferred range of Mn for the di-VB-PSU segments is from about 1200 to about 6000, there being no apparent advantage in using higher Mn. The particular structure of the PAPE segments to which the PDMS segment is connected does not appear to be narrowly critical provided the Tg of the hard PAPE segments is suitably high.

Changing the ratio of PAPE segment to the PDMS will influence the mol wt of the block copolymer formed because of the amount of triblock, and higher blocks, formed. The network modification so obtained will influence the thermal characteristics as well as the toughness of the PSUPDMS oligomers formed, and blends thereof.

In an analogous manner, the particular nature of the vinyl chain ends of the PSU oligomer will influence the physical properties of the networks formed, but to a lesser extent than either the chemical structure of the $Ar_1$ and $Ar_2$ used, the mol wts of each segment, or the plurality of blocks obtained in the hydrosilation reaction.

TABLE 1

Characterization of α,ω-Di(vinylbenzyl)PSU

| Sample | Theoretical* | $\overline{Mn}$ VPO | NMR | GPC Mn | Mw | PD | Thermal Transitions (°C./K) $Tg^i$ | $Tg^f$ | $Tg^f - Tg^i$ |
|---|---|---|---|---|---|---|---|---|---|
| PSU-1 | 830 | 1200 | 1300 | 1250 | 1750 | 1.4 | 75/348 | 213/486 | 138 |
| PSU-2 | 1500 | 2100 | 2500 | 2700 | 3500 | 1.3 | 113/386 | 201/474 | 88 |
| PSU-3 | 3100 | 3200 | 3900 | 4400 | 8100 | 1.8 | 139/412 | 190/463 | 51 |
| PSU-4 | 4100 | 3800 | 5200 | 5500 | 11000 | 2.0 | 147/420 | 190/463 | 43 |
| PSU-5 | 6200 | 5600 | 7500 | 7400 | 17000 | 2.3 | 162/435 | 187/460 | 25 |
| PSU-6 | 8200 | 6900 | 10200 | 10000 | 21000 | 2.1 | 167/440 | 187/460 | 20 |

*based on mole ratio of BPA to DCDPS
**di-VB—PSU is di-VB—[BPA—DPS] structurally represented as

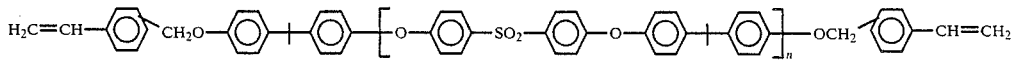

TABLE 2

Characterization of α,ω-Di(silane)Polydimethylsiloxane

| Sample | VPO Mn | GPC Mn | Mw | PD | Tg | Tc | Tm$_1$ | Tm$_2$ |
|---|---|---|---|---|---|---|---|---|
| 1. | 540$^a$ | 430 | 530 | 1.23 | −146 | — | — | — |
| 2. | 1200$^b$ | 1080 | 1800 | 1.67 | −135 | −101 | −51* | −33 |
| 3. | 3400 | 3300 | 7400 | 2.24 | −127 | −90 | −43 | −25 |
| 4 | 3500 | 3800 | 8200 | 2.16 | −128 | −96 | −47 | −27* |
| 5. | 5500 | 5500 | 12800 | 2.33 | −127 | −91 | −46 | −28* |
| 6. | 5600 | 5000 | 12400 | 2.48 | −126 | −86 | −42 | −26* |
| 7. | 11000 | 11400 | 29300 | 2.57 | −124 | −83 | −42** | −28* |

$^a$Mn (NMR) = 550
*Indicates major melting transition
**bimodal

TABLE 3

Reaction Conditions and Characterization of PSU-PDMS-PSU Triblock Polymer

TABLE 4

Characteristics of Blends of "triblocks" of di-VB-PSU-PDMS-PSU with di-VB-PSU

| Samp* | PSU#(Mn)/PDMS#(Mn) | Group | CIB$_z$ (ml) at start$^a$ | Vinyl conv. by NMR$^b$ | PSU(Mn)/PDMS(Mn) Tg | Tc | Tm | Tg (°C./K) | % Triblock in blend | Tg (PDMS) | After Cure (T$_g$) Tm | Cured blend, °C. Tg (PSU) | Tg$_f$−Tg$_i$ |
|---|---|---|---|---|---|---|---|---|---|---|---|---|---|
| 1 | 1 (1200)/1 (540) | A, B | 3 | .58 | — | — | — | 60/333 | 63.0 | — | — | 102/375 | 180* |
| 2 | 1 (1200)/2 (1200) | B | 3 | .55 | — | — | — | 49/322 | 6.3 | — | — | 93/366 | 44 |
| 3 | 1 (1200)/4 (3500) | B, D | 3 | .52 | −122 | — | — | 44/317 | −123 | 73.0 | — | 82/355 | 38 |
| 4 | 1 (1200)/5 (5500) | B | 3 | .56 | −123 | −78 | −43 | 38/311 | −123 | 73 | −43 | 70/343 | 17 |
| 5 | 2 (2100)/1 (540) | A | 3 | .55 | — | *broad transition | | 104/377 | — | — | — | 134/407 | 30 |
| 6 | 3 (3200)/1 (540) | A | 3 | .55 | — | — | — | 127/400 | — | — | — | 153/426 | 26 |
| 7 | 4 (3800)/1 (540) | A, C | 3 | .51 | — | — | — | 136/409 | — | — | — | 156/429 | 20 |
| 8 | 4 (3800)/1 (540) | A, C | 3 | .57 | — | — | — | 139/412 | — | — | — | 162/435 | 23 |
| 9 | 4 (3800)/2 (1200) | C | 5 | .53 | — | — | — | 136/409 | — | — | — | 166/439 | 30 |
| 10 | 4 (3800)/3 (3400) | C, D | 8 | .52 | −126 | — | — | 150/423 | −126 | −94 | −56 | 180/453 | 30 |
| 11 | 3 (3200)/3 (3400) | D | 7 | .50 | −126 | — | — | 137/410 | −122 | −82 | −47 | 178/451 | 41 |
| 12 | 2 (2100)/3 (3400) | D | 6 | .49 | −124 | — | — | 97/370 | −122 | — | — | 128/401 | 31 |

*Samples 1-7 prepared by method A; 8-12 method B
— no transition could be seen in DSC.

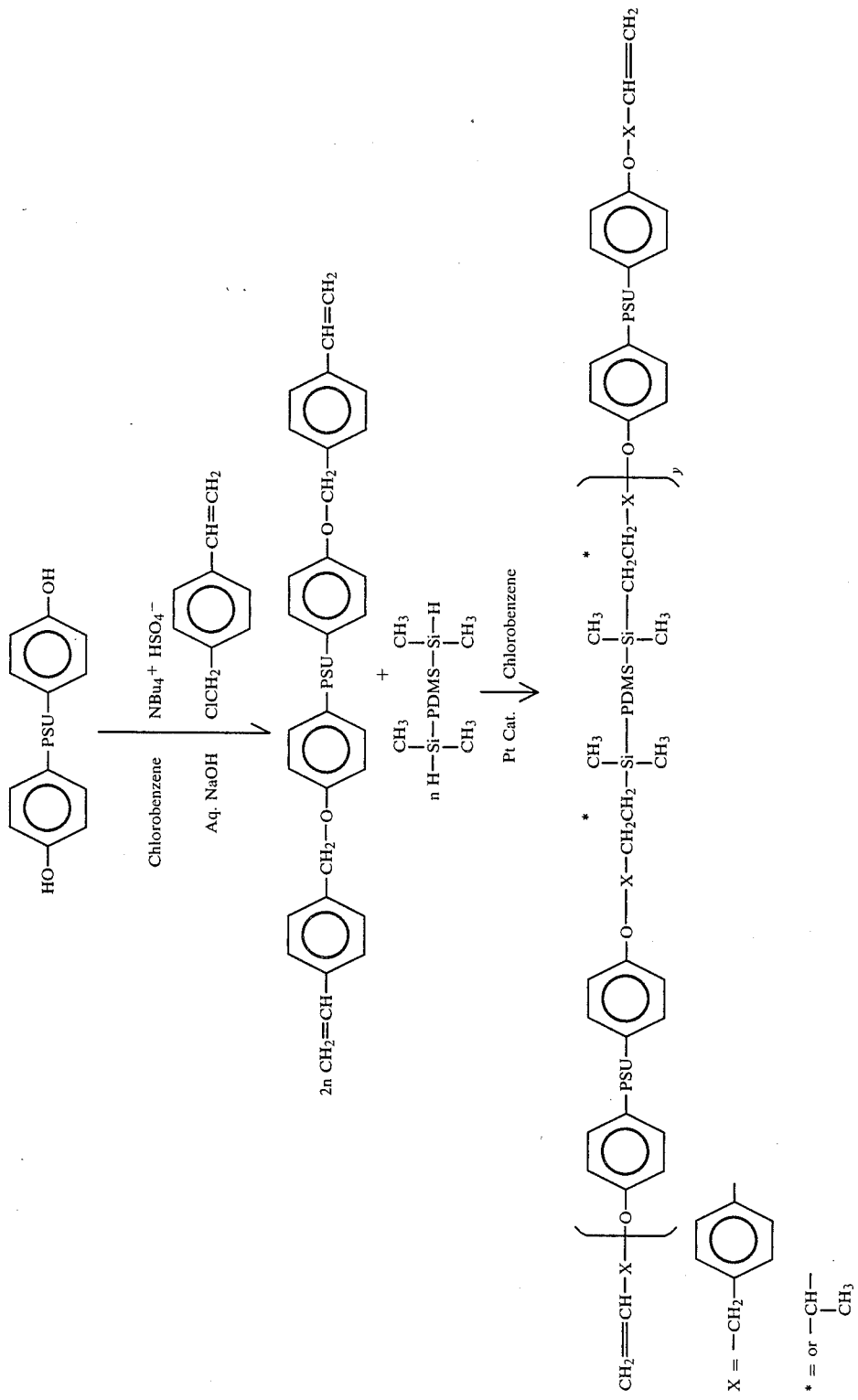

We claim:

1. A substantially linear, thermally crosslinkable, and predominately vinyl terminated triblock oligomer formed through a hydrosilylation reaction in which one of the reactants is a vinyl terminated polyarylene polyether or polyarylene polythioether (PAPE) oligomer represented by the following structure:

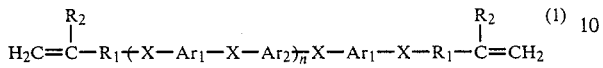
(1)

wherein, X represents O or S,

R1 represents an organic connecting group selected from benzylidene

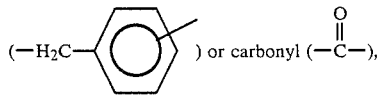
or carbonyl (—C(=O)—),

R2 represents H or CH3, and, n represents an integer corresponding to Mn 700 to 10,000 for the vinyl-terminated PAPE;

Ar1 and Ar2 represent the same or different monoarylene or diarylene segments derived from a dihydric phenol or dihydric thiophenol selected from (5) or (6), and a dihalosubstituted arene, and when Ar1 and Ar2 represent the same monoarylene segment, said PAPE includes a single tetraalkylsubstituted biphenylene linking group to provide for end groups as in (1) on said PAPE in which said structures (5) and (6) are

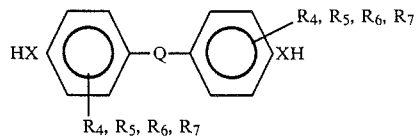

and

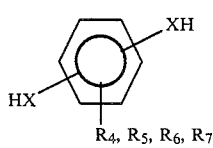
(6)

wherein, Q represents a bond between aromatic carbon atoms or a divalent connecting radical selected from the group consisting of C=O, —O—, —S—, —SO2—, —Si— and divalent organic radicals; and, R4, R5, R6, and R7 are inert substitutents on each ring C atom, the same or different and are selected from the group consisting of NO2; C1-C18 alkyl, without regard for spatial configuration; C1-C18 alkoxy; and hydrogen; and the other reactant is a α,ω-dihydrosiloxane represented by

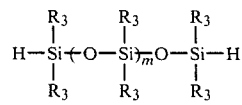
(3)

wherein m represents an integer in the range from about 8 to about 80; and,

R3 represents lower (C1 to C4) alkyl; so that the structure of the triblock formed is represented by the following formulae

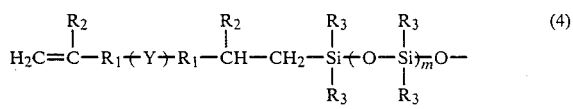
(4)

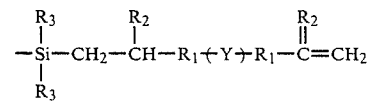

and

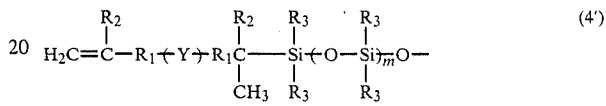
(4')

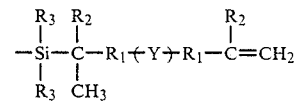

wherein Y is defined as the structure

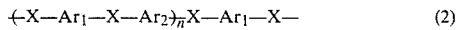
(2)

when Ar1 and Ar2 represent different segments; and, when Ar1 and Ar2 represent the same monoarylene segments Y becomes the structure

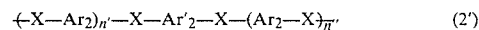
(2')

wherein Ar'2 =

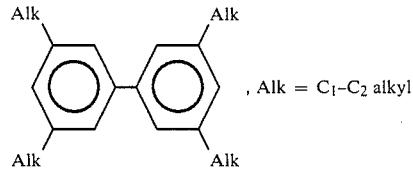, Alk = C1-C2 alkyl with n'+n''=n; and, said triblock has Mn in the range from about 2000 to about 25000.

2. The triblock oligomer of claim 1 wherein X represents O.

3. The triblock oligomer of claim 1 wherein X represents S.

4. The triblock oligomer of claim 1 wherein said structure (1) consists essentially of an end group selected from the group consisting of vinylbenzyl, acrylyl, and methacrylyl.

5. The triblock oligomer of claim 4 wherein said dihydric phenol is selected from the group consisting of 1,4-dihydroxybenzene and a polynuclear phenol selected from the group consisting of 2,2-bis(4-hydroxyphenyl)propane; bis(4-hydroxyphenyl) dimethylsilane; di(hydroxydiphenyl) sulfone; di(hydroxyphenyl) ketone; di(hydroxyphenyl) sulfide and di(hydroxyphenyl) ether.

6. The triblock oligomer of claim 5 wherein one of the combinations of the following dihydric phenols together with dihalides are used to produce Y:
   (i) 2,2-bis(4-hydroxyphenyl)propane and 4,4-dichlorodiphenyl sulfone;
   (ii) 2,2-bis(4-hydroxyphenyl)propane and diphenyl ketone;
   (iii) 4,4'-di(hydroxyphenyl) sulfone and diphenyl ketone;
   (iv) 4,4'-di(hydroxyphenyl) ether and 4,4-dichlorodiphenyl sulfone;
   (v) 1,4-dihydroxybenzene and 4,4-dichlorodiphenyl sulfone;
   (vi) 4,4'-di(hydroxyphenyl) sulfide and 4,4-dichlorodiphenyl sulfone; or,
   (vii) 2,2-bis(4-hydroxyphenyl) propane with 1,4-dihydroxybenzene, and, 4,4-dichlorodiphenyl sulfone, provided there is enough 4,4-dichlorodiphenyl sulfone used to react with all the dihydriophenols present.

7. The triblock oligomer of claim 5 wherein $Ar_1$ and $Ar_2$ in said repeating unit is the same and derived from 2,6-dimethylphenol, and in each chain there is a single group having the structure

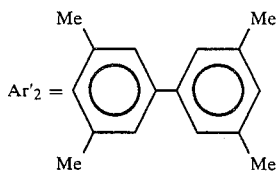

8. The triblock oligomer of claim 7 wherein said structure (1) contains an oligomer of polyphenylene oxide having a mol wt Mn in the range from 1000 to about 10,000.

9. A polyblend consisting essentially of
(A) a minor amount by weight of a substantially linear, thermally crosslinkable predominantly vinyl terminated triblock oligomer formed through a hydrosilation reaction in which one of the reactants is a vinyl terminated polyarylene polyether or polyarylene polythioether (PAPE) oligomer represented by the following structure:

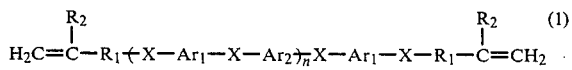

wherein, X represents O or S,
$R_1$ represents an organic connecting group selected from benzylidene

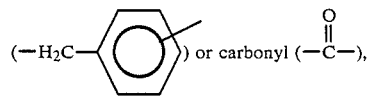

$R_2$ represents H or $CH_3$, and, n represents an integer corresponding to Mn 700 to 10,000 for the vinyl terminated PAPE;

$Ar_1$ and $Ar_2$ represent the same or different monoarylene or diarylene segments derived from a dihydric phenol or dihydric thiophenol selected from (5) or (6), and a dihalosubstituted arene, and when $Ar_1$ and $Ar_2$ represent the same monoarylene segment, said PAPE includes a single tetraalkylsubstituted biphenylene linking group to provide for end groups as in (1) on said PAPE in which said structures (5) and (6) are

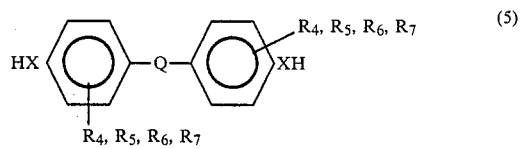

and

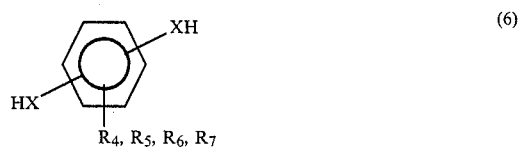

wherein, Q represents a bond between aromatic carbon atoms or a divalent connecting radical selected from the group consisting of C=O, —O—, —S—, —$SO_2$—, —Si— and divalent organic radicals; and, $R_4$, $R_5$, $R_6$, and $R_7$ are inert substitutents on each ring C atom, the same or different and are selected from the group consisting of $NO_2$; $C_1$-$C_{18}$ alkyl, without regard for spatial configuration; $C_1$4 $C_{18}$ alkoxy; and hydrogen; and the other reactant is a α,ω-dihydrosiloxane represented by

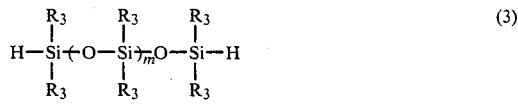

wherein m represents an integer in the range from about 8 to about 80; and,
$R_3$ represents lower ($C_1$ to $C_4$) alkyl; so that the structure of the triblock formed is represented by the following formulae

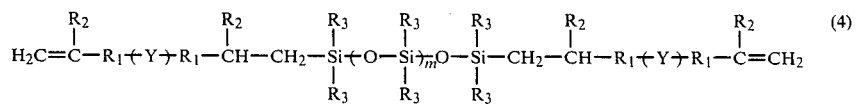

and $$\underset{(4')}{H_2C=\overset{R_2}{\underset{CH_3}{C}}-R_1(Y)R_1\overset{R_2}{\underset{CH_3}{C}}-\overset{R_3}{\underset{R_3}{Si}}(-O-\overset{R_3}{\underset{R_3}{Si}})_m O-\overset{R_3}{\underset{R_3}{Si}}-\overset{R_2}{\underset{CH_3}{C}}-R_1(Y)R_1-\overset{R_2}{C}=CH_2}$$

wherein Y is defined as the structure $$(X-Ar_1-X-Ar_2)_n X-Ar_1-X- \quad (2)$$

when $Ar_1$ and $Ar_2$ represent different segments; and, when $Ar_1$ and $Ar_2$ represent the same monoarylene segments Y becomes the structure $$(X-Ar_2)_{n'}-X-Ar'_2-X-(Ar_2-X)_{n''} \quad (2')$$

wherein

Ar′₂ = [biphenyl with Alk groups at four positions]

Alk = C₁-C₂ alkyl with $n'+n''=n$; and, said triblock has Mn in the range from about 2000 to about 25000; and,
(B) a major amount by weight of said oligomer represented by said structure (1).

10. The polyblend of claim 9 wherein X represents O.
11. The polyblend of claim 9 wherein X represents S.

12. The polyblend of claim 10 wherein said structure (1) consists essentially of an end group selected from the group consisting of vinylbenzyl, acrylyl, and methacrylyl.

13. The polyblend of claim 12 wherein said dihydric phenol is selected from the group consisting of 1,4-dihydroxybenzene and a polynuclear phenol selected from the group consisting of 2,2-bis(4-hydroxyphenyl)propane; bis(4-hydroxyphenyl) dimethylsilane; di(hydroxydiphenyl) sulfone; di(hydroxyphenyl) ketone; di(hydroxyphenyl) sulfide and di(hydroxyphenyl) ether.

14. The polyblend of claim 13 wherein one of the combinations of the following dihydric phenols together with dihalides are used to produce Y:
   (i) 2,2-bis(4-hydroxyphenyl)propane and 4,4-dichlorodiphenyl sulfone;
   (ii) 2,2-bis(4-hydroxyphenyl)propane and dichlorodiphenyl ketone;
   (iii) 4,4′-di(hydroxyphenyl) sulfone and dichlorodiphenyl ketone;
   (iv) 4,4′-di(hydroxyphenyl) ether and 4,4-dichlorodiphenyl sulfone;
   (v) 1,4-dihydroxybenzene and 4,4-dichlorodiphenyl sulfone;
   (vi) 4,4′-di(hydroxyphenyl) sulfide and 4,4-dichlorodiphenyl sulfone; or,
   (vii) 2,2-bis(4-hydroxyphenyl) propane with 1,4-dihydroxybenzene, and, 4,4-dichlorodiphenyl sulfone, provided there is enough 4,4-dichlorodiphenyl sulfone used to react with all the dihydriophenols present.

15. The polyblend of claim 13 wherein $Ar_1$ and $Ar_2$ in said repeating unit is the same and derived from 2,6-dimethylphenol, and in each chain there is a single group having the structure.

Ar′₂ = [biphenyl with Me groups at four positions]

16. The polyblend of claim 15 wherein said structure (1) contains an oligomer of polyphenylene oxide having a mole wt Mn in the range from 1000 to about 10,000.

17. A process for preparing a triblock oligomer having the structure $$\underset{(4)}{H_2C=\overset{R_2}{C}-R_1(Y)R_1-\overset{R_2}{C}H-CH_2-\overset{R_3}{\underset{R_3}{Si}}(-O-\overset{R_3}{\underset{R_3}{Si}})_m O-\overset{R_3}{\underset{R_3}{Si}}-CH_2-\overset{R_2}{C}H-R_1(Y)R_1-\overset{R_2}{C}=CH_2}$$

and $$\underset{(4')}{H_2C=\overset{R_2}{\underset{CH_3}{C}}-R_1(Y)R_1\overset{R_2}{\underset{CH_3}{C}}-\overset{R_3}{\underset{R_3}{Si}}(-O-\overset{R_3}{\underset{R_3}{Si}})_m O-\overset{R_3}{\underset{R_3}{Si}}-\overset{R_2}{\underset{CH_3}{C}}-R_1(Y)R_1-\overset{R_2}{C}=CH_2}$$

wherein Y is defined as the structure $$(X-Ar_1-X-Ar_2)_n X-Ar_1-X- \quad (2)$$

when $Ar_1$ and $Ar_2$ represent different segments; and, when $Ar_1$ and $Ar_2$ represent the same monoarylene segments Y becomes the structure $$(X-Ar_2)_{n'}-X-Ar'_2-X-(Ar_2-X)_{n''} \quad (2')$$

wherein

Ar′₂ = [biphenyl with Alk groups at four positions]

Alk = $C_1$–$C_2$ alkyl
X represents O, S with $n'+n''=n$; and, said triblock has Mn in the range from about 2000 to about 25000, comprising, (a) reacting a polyarylene polyether or polyarylene polythioether oligomer having vinyl end groups and a number average molecular weight Mn in the range from about 700 to about 10,000 with a polydialkylsiloxane oligomer having $\equiv$Si—H end groups and Mn in the range from about 600 to about 5000, in the presence of a solvent for each reactant, and a sufficient amount of a platinum catalyst to form said triblock, wherein $R_1$ represents an organic connecting group selected from benzylidene

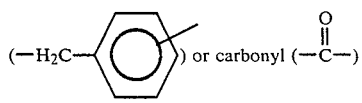

$R_2$ represents H or $CH_3$, $R_3$ represents lower ($C_1$ to $C_4$) alkyl, m represents an integer in the range from 8 to about 80, $Ar_1$ and $Ar_2$ represent the same or different monoarylene or diarylene segments derived from a dihydric phenol or dihydric thiophenol selected from (5) or (6), and a dihalosubstituted arene, and when $Ar_1$ and $Ar_2$ represent the same monoarylene segment, the polyarylene polythioether oligomer includes a single tetraalkylsubstituted biphenylene linking group to provide for vinyl end groups as in which said structures (5) and (6) are

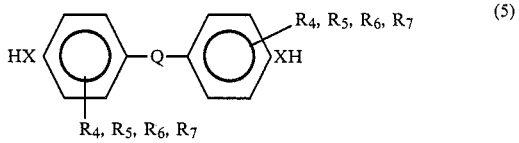

and

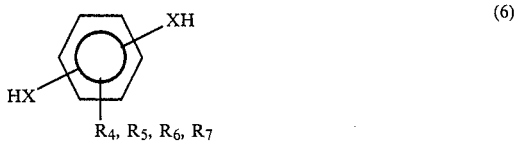

wherein, Q represents a bond between aromatic carbon atoms or a divalent connecting radical selected from the group consisting of C=O, —O—, —S—, —$SO_2$—, —Si— and divalent organic radicals; and $R_4$, $R_5$, $R_6$ and $R_7$ are inert substitutents on each ring C atom, the same or different, and are selected from the group consisting of $NO_2$; $C_1$–$C_{18}$ alkyl, without regard for spatial configuration, $C_1$–$C_{18}$ alkoxy and hydrogen. and, (b) recovering said triblock oligomer.

18. The process of claim 17, including in addition, blending a minor amount by weight of said triblock oligomer, relative to the amount of said polyarylene polyether or polyarylene polythioether oligomer, but sufficient to provide interchain microphase incompatibility of said polydialkylsiloxane segments and result in improved toughness and impact resistance of the blend so formed.

* * * * *

UNITED STATES PATENT AND TRADEMARK OFFICE
CERTIFICATE OF CORRECTION

PATENT NO. : 4,871,816
DATED : October 3, 1989
INVENTOR(S) : Virgil Percec, et al.

It is certified that error appears in the above-identified patent and that said Letters Patent is hereby corrected as shown below:

Columns 13 and 14, Tables 3 and 4 are run together so that they are not clearly readable.

Column 19, line 19, "dihydriophenols" should read --dihydric phenols--.

Column 19, line 33, "Me = methyl" is omitted as part of the formula.

Column 20, line 43, "$C_1$ 14 $C_{18}$" should read --$C_1$ - $C_{18}$--.

Column 22, line 16, "dihydriophenols" should read --dihydric phenols--.

Column 24, line 27, there should not be a period after "hydrogen".

Signed and Sealed this

Fourth Day of August, 1992

Attest:

DOUGLAS B. COMER

Attesting Officer

Acting Commissioner of Patents and Trademarks